United States Patent
Hong et al.

(10) Patent No.: US 11,427,455 B2
(45) Date of Patent: Aug. 30, 2022

(54) DECOMPRESSION MECHANISM AND BEVERAGE MAKER HAVING DECOMPRESSION MECHANISM

(71) Applicant: LG ELECTRONICS INC., Seoul (KR)

(72) Inventors: Jinpyo Hong, Seoul (KR); Youngjoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 471 days.

(21) Appl. No.: 16/506,015

(22) Filed: Jul. 9, 2019

(65) Prior Publication Data

US 2020/0017346 A1    Jan. 16, 2020

(30) Foreign Application Priority Data

Jul. 10, 2018   (KR) .......................... 10-2018-0079849

(51) Int. Cl.
*B67D 1/00*     (2006.01)
*F16K 47/06*    (2006.01)
*C12C 11/00*    (2006.01)

(52) U.S. Cl.
CPC ......... *B67D 1/0021* (2013.01); *B67D 1/0074* (2013.01); *C12C 11/006* (2013.01); *F16K 47/06* (2013.01); *B67D 2210/00031* (2013.01)

(58) Field of Classification Search
CPC ........ F16K 47/12; F16K 47/04; F16K 47/045; F16K 47/06; B67D 1/0021; B67D 1/0074; B67D 2210/00031; C12C 11/00; C12C 11/006; C12C 11/003; A47J 31/00; A47J 31/44; A47J 31/4403
See application file for complete search history.

(56) References Cited

U.S. PATENT DOCUMENTS

| | | | | |
|---|---|---|---|---|
| 2,323,115 A | * | 6/1943 | Bryant | G05D 13/00 138/43 |
| 2,447,920 A | * | 8/1948 | Terry | F16K 47/12 138/43 |
| 3,840,209 A | * | 10/1974 | James | F16L 55/02772 251/216 |
| 3,878,360 A | * | 4/1975 | Augustine | A47J 31/461 392/444 |
| 4,044,991 A | * | 8/1977 | Waller | F16K 47/06 251/126 |
| 4,506,423 A | * | 3/1985 | Nakamura | F25B 41/30 29/890.14 |

(Continued)

*Primary Examiner* — Andrew D St.Clair
(74) *Attorney, Agent, or Firm* — KED & Associates

(57) ABSTRACT

A decompression mechanism may include a decompression case having an inlet that receives a beverage and an outlet that discharges the beverage; a decompression inner member including an inner body positioned inside of the decompression case and a guide formed in a spiral shape on an outer circumference of the inner body and in contact with an inner face of the decompression case; and a decompression channel defined between the decompression case and the decompression inner member. The decompression channel may have an input opening in communication with the inlet and an output opening in communication with the outlet, and a cross-sectional area of the decompression channel may increase as the decompression channel extends from the input opening to the output opening.

6 Claims, 8 Drawing Sheets

(56) References Cited

U.S. PATENT DOCUMENTS

| | | | | |
|---|---|---|---|---|
| 4,634,434 | A | * | 1/1987 | Marino, Jr. ............. F16K 47/06 251/126 |
| 7,832,653 | B2 | * | 11/2010 | Yukimoto ............... F25B 41/31 236/92 B |
| 8,601,936 | B2 | * | 12/2013 | Williams ............. C12G 1/0206 99/281 |
| 2005/0224737 | A1 | * | 10/2005 | Mihaylov ............... F16K 47/12 251/126 |
| 2015/0075388 | A1 | * | 3/2015 | Deng .................. B67D 1/0861 99/295 |
| 2017/0335256 | A1 | * | 11/2017 | Park ...................... C12C 11/006 |

* cited by examiner

DECOMPRESSION MECHANISM AND BEVERAGE MAKER HAVING DECOMPRESSION MECHANISM

CROSS-REFERENCE TO RELATED APPLICATION(S)

The present application claims priority to Korean Patent Application No. 10-2018-0079849, filed in Korea on Jul. 10, 2018, the entire contents of which is incorporated herein for all purposes by this reference.

BACKGROUND

1. Field

A decompression mechanism and a beverage maker including a decompression mechanism are disclosed herein.

2. Background

A beverage is collectively referred to as a drinkable liquid, such as alcohol, or tea, for example. Beverages may be divided into various categories, such as water (drinking water) to solve a thirst, a fruit drink with a unique flavor and taste, a soft drink providing a refreshing feeling, a beverage which may provide an awakening effect, or an alcoholic beverage with an alcohol effect, for example.

A representative example of such a beverage is beer. Beer is made by sprouting barley to make malt, juicing the malt to make a juice, adding hop into the juice, and then fermenting the juice with yeast.

Consumers may purchase processed products made by a beer producing company or drink house beer (or handmade beer) made by fermenting ingredients of beer in a home or bar. House beer may be produced in more varieties than the processed products and may be produced based on a consumer's taste.

The ingredients for beer production may be water, malt, hop, yeast, and a flavoring additive, for example. The yeast may be referred to as leaven and added to the malt to ferment the malt or to help produce alcohol and carbonic acid. The flavoring additive is an additive that enhances a taste of the beer, such as fruit, syrup, or vanilla beans, for example.

Generally, house beer may be passed through a total of three stages, including a wort production stage, a fermentation stage, and an aging stage. It may take from 2 to 3 weeks from the wort production stage to the aging stage.

It is important that house beer maintains an optimum temperature during the fermentation stage, and the easier the house beer is to produce, the greater a convenience of a user. Recently, a beverage maker, which may easily produce house beer at a home or in a bar, is gradually being used. This beverage maker is preferable to produce the beer safely and easily.

BRIEF DESCRIPTION OF THE DRAWINGS

Embodiments will be described in detail with reference to the following drawings in which like reference numerals refer to like elements, and wherein.

DETAILED DESCRIPTION

Figure 1:
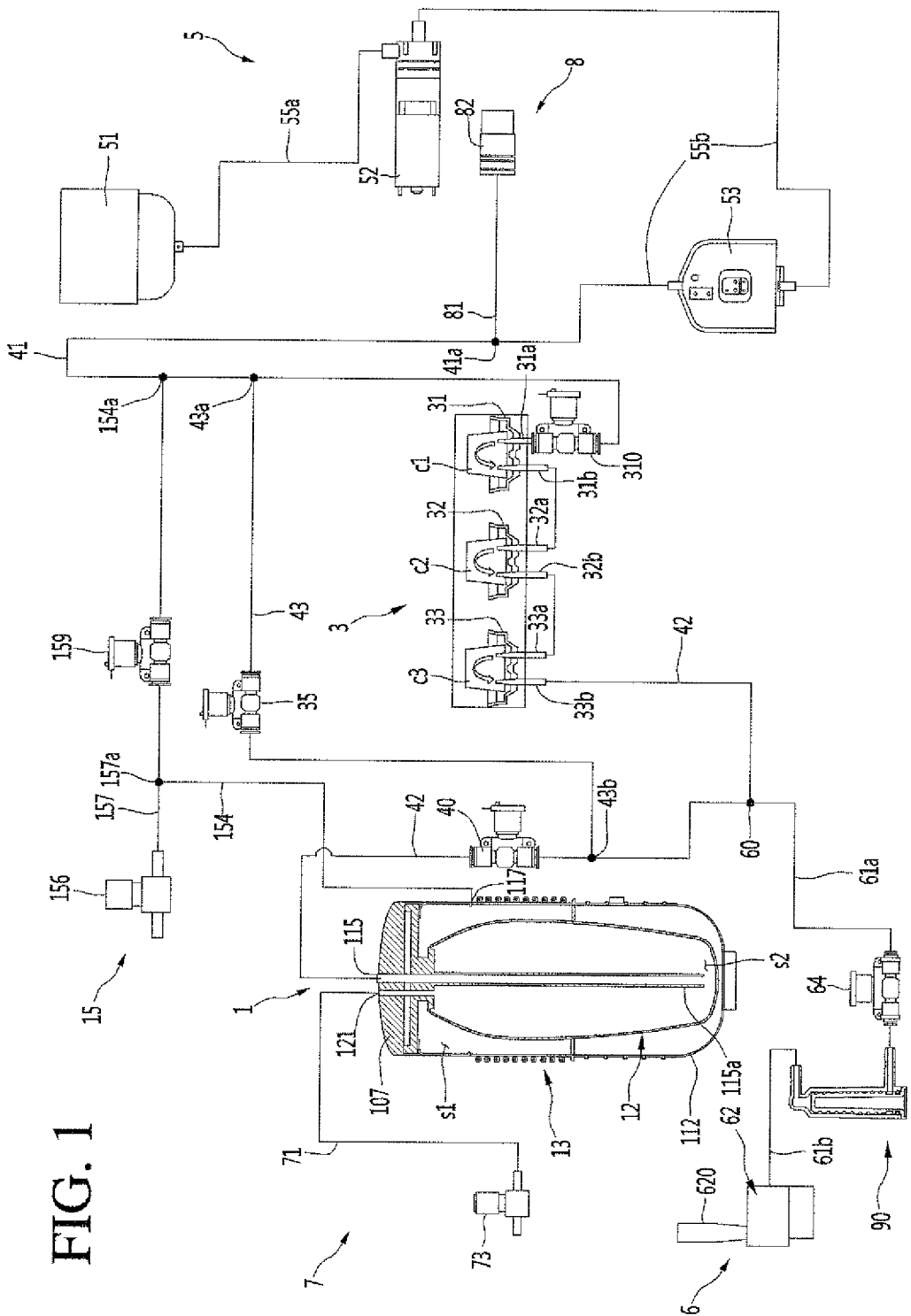
FIG. 1 is a schematic diagram of a beverage maker according to an embodiment.

Hereinafter, embodiments will be described in detail with reference to drawings. Wherever possible, the same or like reference numerals have been used to indicate the same or like elements and repetitive disclosure has been omitted.

Hereinafter, beer is used as an example of a beverage produced using a beverage maker, but the type of the beverage produced using the beverage maker is not limited to the beer. Various types of beverages may be produced by the beverage maker according to embodiments.

FIG. 1 is a schematic diagram of a beverage maker according to an embodiment. The beverage maker may include a fermenting module 1. In the fermenting module 1, beverage fermentation may proceed.

The beverage maker may include a water supply module 5. The water supply module 5 may supply water.

The beverage maker may include an ingredient feeder 3 having ingredient receiving portions or containers 31, 32, and 33 that receive ingredients necessary to produce the beverage therein. The beverage maker may also include main channels 41 and 42 that connect the water supply module 5 and the fermenting module 1 with each other.

The beverage maker may include a beverage discharger 6 that discharges a beverage produced in the fermenting module 1 to an outside. The beverage discharger 6 may be connected to second main channel 42, whereby the beverage discharged from the fermenting module 1 may pass through a portion of the second main channel 42 and be guided to the beverage discharger 6.

The beverage maker may further include a gas discharger 7. The gas discharger 7 may be connected to the fermenting module 1 to discharge a gas generated during production of the beverage.

The beverage maker may further include an air injector 8 that injects air. The air injector 8 may be connected to the water supply module 5 or first main channel 41. The air injector 8 may include an air pump 82.

The beverage maker may further include an air regulator 15 that regulates a pressure between an inner wall of a fermentation vessel 112 and an outer face of the fermentation container 12.

Hereinafter, the fermenting module 1 will be described.

The fermenting module 1 may include fermentation vessel 112 having an opening defined therein, and a fermentation lid 107 that opens and closes the opening. A space S1 in which fermentation container 12 may be received may be defined in the fermentation vessel 112. That is, the fermentation container 12 may be received in the fermentation vessel 112.

The fermentation container 12 may be a separate container provided such that beverage ingredients and a finished beverage are not in contact with the inner wall of the fermentation vessel 112. The fermentation container 12 may be removably provided in the fermentation vessel 112. The fermentation container 12 may be mounted inside the fermentation vessel 112 to ferment the beverage in the fermentation vessel 112. Further, the fermentation container 12 may be withdrawn to the outside of the fermentation vessel 112 after use is complete.

The fermentation container 12 may be a pack that receives ingredients for beverage production therein. The fermentation container 12 may be formed of a flexible material, for example, such that the fermentation container 12 may be easily inserted into the fermentation vessel 112 and may be contracted and expanded by a pressure. However, embodiments are not limited thereto, for example, the fermentation container 12 may contain a PET (polyethylene terephthalate) material.

In the fermentation container 12, a beverage producing space S2 may be defined in which beverage ingredients may be received and the beverage produced. An area of the fermentation container 12 may be smaller than an area of the internal space S1 of the fermentation vessel 112.

The fermentation container 12 may be inserted and received in the fermentation vessel 112 with ingredients received therein. The fermentation container 12 may be inserted into the fermentation vessel 112 and received in the fermentation vessel 112 while the fermentation lid 107 is open.

The fermentation lid 107 may seal the fermentation vessel 112 after the fermentation container 12 is inserted into the fermentation vessel 112. The fermentation container 12 may assist fermentation of the ingredients while in a state of being received in the internal space S1 sealed by the fermentation vessel 112 and the fermentation lid 107. The fermentation container 12 may be expanded by the pressure therein during production of the beverage. When the beverage received therein is discharged and air supplied between the inner face of the fermentation vessel 112 and the outer face of the fermentation container 12, the fermentation container 12 may be compressed by air inside the fermentation vessel 112.

The fermentation lid 107 may seal the interior of the fermentation vessel 112. The fermentation lid 107 may be disposed at a top of the fermentation vessel 112 to cover the opening. The fermentation lid 107 may have a main channel connection 115 connected to the main channel, more specifically, to the second main channel 42. The main channel connection 115 may communicate with the beverage production space S2 of the fermentation container 12.

A tube 115a that communicates with the main channel connection 115 may be provided in a vertically extended manner inside the fermentation container 12. A bottom of the tube 115a may be adjacent to a bottom of the fermentation container 12 and the beverage in the fermentation container 12 may be easily suctioned into the tube 115a during discharge of the beverage.

The fermentation vessel 112 may have a temperature regulator 13. The temperature regulator 13 may change an internal temperature of the fermentation vessel 112. The temperature regulator 13 may heat or cool the fermentation vessel 112. The temperature regulator 13 may regulate the temperature of the fermentation vessel 112 to an optimal temperature for beverage fermentation.

The temperature regulator 13 may include at least one of a cooling cycle apparatus or a heater. However, the temperature regulator 13 is not limited thereto, and in one embodiment, the temperature regulator 13 may include a thermoelectric element (TEM).

In one embodiment, the cooling cycle apparatus of the temperature regulator 13 may cool the fermentation vessel 112 to regulate the temperature of the fermentation vessel 112. The cooling cycle apparatus may include a compressor, a condenser, an expansion apparatus, and an evaporator, for example. The evaporator may be disposed to be in contact with an outer face of the fermentation vessel 112. The evaporator may be composed of an evaporation tube that is wounded on the outer face of the fermentation vessel 112.

Hereinafter, main channels 41 and 42 and a bypass channel 43 will be described.

As described above, the main channels 41 and 42 may include first main channel 41 that connects the water supply module 5 and the ingredient feeder 3 and second main channel 42 that connects the ingredient feeder 3 and the fermenting module 1. That is, the first main channel 41 may guide the water supplied from the water supply module 5 to the ingredient feeder 3, and the second main channel 42 may guide a mixture of the ingredient discharged from the ingredient feeder 3 and the water to the fermenting module 1.

One or a first end 41a of the first main channel 41 may be connected to the water supply module 5 and the other or a second end thereof may be connected to the ingredient feeder 3. An ingredient supply valve 310 that opens and closes the first main channel 41 may be provided on the first main channel 41. The ingredient supply valve 310 may be part of the ingredient feeder 3. The ingredient supply valve 310 may be opened upon insertion of additives to be respectively received in the ingredient receiving portions 31, 32, and 33 to open the first main channel 41.

One or a first end of the second main channel 42 may be connected to the main channel connection 115 of the fermenting module 1 and the other or a second end thereof may be connected to the ingredient feeder 3. A main valve 40 for that opens and closes the second main channel 42 may be provided on the second main channel 42.

The main valve 40 may open when the water is fed to the fermentation container 12 to open the second main channel 42. The main valve 40 may be closed during the cooling of the fermentation vessel 112 to close the second main channel 42. The main valve 40 may open when air is injected into the fermentation container 12 to open the second main channel 42. The main valve 40 may open when additives are fed into the fermentation container 12 to open the second main channel 42. The main valve 40 may be closed during fermentation of the ingredients to seal the inside of the fermentation container 12. The main valve 40 may be closed during beverage aging and storing to seal the inside of the fermentation container 12. The main valve 40 may be opened at beverage discharging by the beverage discharger 6 to open the second main channel 42 and the beverage in the fermentation container 12 may pass through the main valve 40 and flow to the beverage discharger 6.

The main channels 41 and 42 may be one continuous channel when the beverage maker does not include the ingredient feeder 3. When the beverage maker includes the ingredient feeder 3, the beverage maker may further include the bypass channel 43 configured to allow the water or air to bypass the ingredient receiving portions 31, 32, and 33.

The bypass channel 43 may bypass the ingredient receiving portions 31, 32, and 33 and connect the first main channel 41 and the second main channel 42 with each other. One or a first end 43a of the bypass channel 43 may be connected to the first main channel 41 and the other or a second end 43b thereof may be connected to the second main channel 42. That is, the first end 43a of the bypass channel 43 may be connected between the water supply module 5 and the ingredient supply valve 310 with respect to the first main channel 41 and the second end 43b thereof may be connected between the main valve 40 and the ingredient feeder 3 with respect to the second main channel 42.

The bypass channel 43 may have a bypass valve 35 that opens and closes the bypass channel 43. The bypass valve 35 may open the bypass channel 43 when the water supplied from the water supply module 5 is supplied to the fermentation container 12. The bypass valve 35 may open the bypass channel 43 when the air injected from the air injector 8 is supplied to the fermentation container 12.

Hereinafter, the ingredient feeder 3 will be described.

When producing beer using the beverage maker, ingredients for producing the beer may include water, malt, yeast, hop, and flavoring additive, for example. The beverage maker may include both the ingredient feeder 3 and the fermentation container 12, and the ingredients for beverage production may be dispersed and received in the ingredient feeder 3 and fermentation container 12. The fermentation container 12 may receive some of the ingredients for beverage production therein and the remaining ingredients may be received in the ingredient feeder 3. The remaining ingredients received in the ingredient feeder 3 may be fed to the fermentation container 12 along with the water supplied from the water supply module 5 or may be mixed with some of the ingredients received in the fermentation container 12.

A main ingredient essential for beverage production may be received in the fermentation container 12 and additives that are added to the main ingredient may be received in the ingredient feeder 3. In this case, the additives received in the ingredient feeder 3 may be mixed with the water fed from the water supply module 5 and fed to the fermentation container 12 or may be mixed with the main ingredient received in the fermentation container 12.

The main ingredient received in the fermentation container 12 may be an ingredient which is more abundant than other ingredients. For example, in the case of beer production, the main ingredient may be malt among the malt, yeast, hop, and flavor additives. In addition, additives received in the ingredient feeder 3 may be ingredients other than the malt among the ingredients for beer production, therefore, may be the yeast, hop, and flavoring additives, for example.

The beverage maker may not include the ingredient feeder 3 and include only the fermentation container 12. In this case, the fermentation container 12 may receive the main ingredient therein, and a user may directly add the additives into the fermentation container 12.

When the beverage maker includes both the ingredient feeder 3 and the fermentation container 12, the beverage may be more easily produced. For the sake of convenience, a following description will be given as an example including both the ingredient feeder 3 and the fermentation container 12. However, embodiments are not limited to the example including both the ingredient feeder 3 and the fermentation container 12.

The ingredients in the fermentation container 12 may be fermented over time. In addition, the produced beverage in the fermentation container 12 may flow to the second main channel 42 through the main channel connection 115 and may flow from the second main channel 42 to the beverage discharger 6 and be discharged therefrom.

The ingredient feeder 3 may receive the ingredients required for beverage production and may be configured to allow the water supplied from the water supply module 5 to pass therethrough. For example, when the beverage produced in the beverage maker is beer, the ingredients received in the ingredient feeder 3 may be yeast, hop, and flavoring additives, for example.

The ingredients received in the ingredient feeder 3 may be directly and respectively received in the ingredient receiving portions 31, 32, and 33 formed in the ingredient feeder 3. At least one ingredient receiving portion 31, 32, and/or 33 may be formed in the ingredient feeder 3. A plurality of ingredient receiving portions 31, 32, and 33 may be formed in the ingredient feeder 3. In this case, the plurality of ingredient receiving portions 31, 32, and 33 may be partitioned from each other.

Each of the ingredient receiving portions 31, 32, and 33 may have an inlet 31a, 32a, and 33a into which the fluid flows and an outlet 31b, 32b, and 33b through which the fluid may flow out. The fluid entering the inlet of one ingredient receiving portion may be mixed with the ingredient in the ingredient receiving portion and then the mixture may exit through the outlet.

In one embodiment, ingredients received in the ingredient feeder 3 may be respectively received in ingredient containers C1, C2, and C3. In this case, the ingredient receiving portions 31, 32, and 33 may respectively receive the ingredient containers C1, C2, and C3. Each of the ingredient receiving portions 31, 32, and 33 may be referred to as an ingredient container mount. The ingredient containers C1, C2, and C3 may be, for example, a capsule or a pod; however, embodiments are not limited thereto.

When the ingredients are respectively received in the ingredient containers C1, C2, and C3, the ingredient feeder 3 may be configured to receive and have withdrawn therefrom the ingredient containers C1, C2, and C3. In addition, the ingredient feeder 3 may be configured as an ingredient container kit assembly in which the ingredient containers C1, C2, and C3 may be removably received.

For example, the ingredient feeder 3 may receive a first additive, a second additive, and a third additive. The first additive may be yeast, the second additive may be hop, and the third additive may be flavoring additive. The ingredient feeder 3 may include a first ingredient container mount 31 in which first ingredient container C1 receiving therein the first additive may be received; a second ingredient container mount 32 in which second ingredient container C2 receiving therein the second additive may be received; and a third ingredient container mount 33 in which a third feeding container C3 receiving therein the third additive may be received.

The ingredients respectively contained in the ingredient receiving portions 31, 32, and 33 or ingredient containers C1, C2, and C3 may be discharged by water pressure of water supplied from the water supply module 5.

When the ingredients are discharged by the water pressure, the water fed from the water supply module 5 to the first main channel 41 may be mixed with the ingredients while passing through the ingredient receiving portions 31, 32, and 33 or ingredient containers C1, C2, and C3. Further, the ingredients respectively contained in the ingredient receiving portions 31, 32, and 33 or ingredient containers C1, C2, and C3 may flow to the second main channel 42 along with the water.

A number of additives of different types may be received separately in the ingredient feeder 3. For example, in the production of beer, a number of additives received in the ingredient feeder 3 may be yeast, hop, and a flavoring additive, which may be received separately.

When a plurality of ingredient receiving portions is formed in the ingredient feeder 3, the plurality of ingredient receiving portions 31, 32, and 33 may be connected in series or in parallel in a flow direction of the water. For example, when the plurality of ingredient receiving portions is connected in series as shown in FIG. 1, first main channel 41 may be connected to inlet 31a of first ingredient container mount 31, outlet 31b of first ingredient container mount 31 may be in communication with inlet 32a of the second ingredient container mount 32, outlet 32b of the second ingredient container mount 32 may be in communication with inlet 33a of the third ingredient container mounting portion 33, and outlet 33b of the third ingredient container mount 33 may be connected to the second main channel 42.

Hereinafter, water supply module 5 will be described.

The water supply module 5 may include a water tank 51, a water supply pump 52 that pumps water in the water tank 51, and a water supply heater 53 that heats the pumped water from the water supply pump 52. The water tank 51 and the water supply pump 52 may be connected to a water tank outflow channel 55a and the water contained in the water tank 51 may be suctioned into the water supply pump 52 through the water tank outflow channel 55a.

The water supply pump 52 and the first end 41a of the first main channel 41 may be connected to a water supply channel 55b and the water discharged from the water supply pump 52 may be guided to the first main channel 41 through the water supply channel 55b. The water supply heater 53 may be installed on the water supply channel 55b.

When driving the water supply pump 52, the water in the water tank 51 may be suctioned into the water supply pump 52 through the water tank outflow channel 55a and the water discharged from the water supply pump 52 may be heated in the water supply heater 53 and guided to the first main channel 41 while flowing through the water supply channel 55b.

Hereinafter, beverage discharger 6 will be described.

The beverage discharger 6 may be connected to the second main channel 42. The beverage discharger 6 may include a first beverage discharge channel 61a in communication with the fermenting module 1; a beverage discharge valve 64 installed on the first beverage discharge channel 61a; a decompression mechanism 90 connected to the first beverage discharge channel 61a; a second beverage discharge channel 61b through which the beverage passed through the decompression mechanism 90 may flow; and a dispenser 62 connected to the second beverage discharge channel 61b.

The first beverage discharge channel 61a may be connected to the second main channel 42 to communicate with the fermenting module 1. The first beverage discharge channel 61a may communicate with the beverage producing space S2 in the fermentation container 12.

One or a first end 60 of the first beverage discharge channel 61a may be connected between the ingredient feeder 3 and the main valve 40 at the second main channel 42 and the other or a second end thereof may be connected to the decompression mechanism 90. The decompression mechanism 90 may be installed at a rear of the beverage discharge valve 64 in a discharge direction of the beverage.

The decompression mechanism 90 may be configured to prevent a sudden increase in a pressure of the beverage passed through the beverage discharge valve 64. Accordingly, the decompression mechanism 90 may be disposed adjacent to the beverage discharge valve 64. That is, the decompression mechanism 90 may be more closer to the beverage discharge valve 64 than to the dispenser 62 in a flow direction of the beverage. The beverage discharge valve 64 and decompression mechanism 90 may be directly connected with each other.

A pressure of the beverage passing through the decompression mechanism 90 may be gradually lowered. The beverage passed through the decompression mechanism 90 may be discharged at the dispenser 62 and may not generate excessive bubbles.

The decompression mechanism 90 will be described hereinbelow.

The beverage discharge valve 64 which opens and closes the first beverage discharge channel 61a may be installed on the first beverage discharge channel 61a. The beverage discharge valve 64 may include a solenoid valve.

When the beverage is discharged, the beverage discharge valve 64 may be open. Further, when the beverage is not discharged, the beverage discharge valve 64 may be kept closed.

The second beverage discharge channel 61b may connect the discharger 90 with the dispenser 62. The beverage that has passed through the decompression mechanism 90 may be guided to the dispenser 62 through the second beverage discharge channel 61b.

The dispenser 62 may be provided with an operating portion 620, such as a lever. The user may manipulate the operating portion 620 to adjust discharging of the beverage. When the user opens the operating portion 620, the beverage may be discharged from the dispenser 62.

Hereinafter, gas discharger 7 will be described.

The gas discharger 7 may be connected to the fermenting module 1 and discharge gas generated in the fermentation container 12. The gas discharger 7 may include a gas discharge channel 71 connected to the fermenting module 1, and a gas discharge valve 73 connected to the gas discharge channel 71.

The gas discharge channel 71 may be connected to the fermenting module 1, in particular, to the fermentation lid 107. The fermentation lid 107 may be provided with a gas discharge channel connection 121 to which the gas discharge channel 71 may be connected.

The gas discharge channel connection 121 may communicate with the beverage producing space S2 of the fermentation container 12. The gas in the fermentation container 12 may flow to the gas discharge channel 71 through the gas discharge channel connection 121 and may be discharged through the open gas discharge valve 73.

The beverage maker may inject air into the fermentation container 12 by the air injector 8 to evenly mix malt and water with each other. At this time, bubbles generated in the liquid malt may be discharged to the outside through the gas discharge channel 71 and the gas discharge valve 73 at an upper portion of the fermentation container 12. Further, the gas discharge valve 73 may be kept closed during the fermentation of the beverage.

Hereinafter, air injector 8 will be described.

The air injector 8 may be connected to the water supply channel 55b or to the first main channel 41 to inject air. The air injected from the air injector 8 into the first main channel 41 may be injected into the fermentation container 12 through the bypass channel 43 and the second main channel 42 in sequence. Thus, agitation or aeration may be performed in the fermentation container 12.

In addition, the air injected from the air injector 8 into the first main channel 41 may remove residual water or residue while passing through ingredient receiving portions 31, 32, and 33. This allows the ingredient receiving portions 31, 32, and 33 to remain clean.

The air injector 8 may include an air injection channel 81 connected to water supply channel 55b or the first main channel 41, and an air pump 82 connected to the air injection channel 81. The air pump 82 may pump air into the air injection channel 81.

Hereinafter, air regulator 15 will be described.

The air regulator 15 may regulate a pressure between the inner wall of the fermentation vessel 112 and the outer face of the fermentation container 12. The air regulator 15 may supply air between the fermentation container 12 and the inner wall of the fermentation vessel 112, or may exhaust the air between the fermentation container 12 and the inner wall of the fermentation vessel 112 to the outside.

The air regulator 15 may include an air supply channel 154 connected to the fermenting module 1, and an air exhaust channel 157 connected to the air supply channel 154 and exhausting the air to the outside. One or a first end 154a of the air supply channel 154 may be connected to the first main channel 41 and the other or a second end thereof may be connected to the fermenting module 1.

The fermenting module 1 may be provided with an air supply channel connection 117 to which the air supply channel 154 may be connected. The air supply channel connection 117 may be in communication with the space between the inner wall of the fermentation vessel 112 and the outer face of the fermentation container 12. In one embodiment, the air supply channel connection 117 may be provided at the fermentation lid 107 rather than at the fermentation vessel 112.

The air injected from the air injector 8 into the first main channel 41 may be guided through the air supply channel 154 between the outer face of the fermentation container 12 and the inner wall of the fermentation vessel 112. Thus, the air supplied into the fermentation vessel 112 may pressurize the fermentation container 12 between the outer face of the fermentation container 12 and the inner wall of the fermentation vessel 112.

The beverage in the fermentation container 12 may be pressurized by the fermentation container 12 depressed by the air and may flow through the main channel connection 115 to the second main channel 42 when the main valve 40 and the beverage discharge valve 64 are open. The beverage flowing from the fermentation container 12 to the second main channel 42 may be discharged out through the beverage discharger 6.

The air exhaust channel 157 may function as an air exhaust passage that exhausts the air between the fermentation container 12 and the fermentation vessel 112 to the outside, together with a portion of the air supply channel 154. The air supply channel 154 may include a first channel from the connection 154a to which the first main channel 41 may be connected to a connection 157a to which the air exhaust channel 157 may be connected; and a second channel from the connection 154a to which the air exhaust channel 157 may be connected to the air supply channel connection 117. The first channel may be an air supply channel that directs air pumped from the air pump 82 to the second channel. Further, the second channel may be an air supply and exhaust channel that supplies the air passed through the air supply channel to between the fermentation vessel 112 and the fermentation container 12, or for directing the air flowing out between the fermentation vessel 112 and the fermentation container 12 to the connection channel 157.

An exhaust valve 156 that opens and closes the air exhaust channel 157 may be connected to the air exhaust channel 157. The exhaust valve 156 may be opened to allow the air between the fermentation container 12 and the fermentation vessel 112 to be exhausted to the outside when the fermentation container 12 is expanded during beverage production.

The air regulator 15 may further include an air supply valve 159 that controls the air pumped at the air pump 82 and then supplied to between the fermentation container 12 and the fermentation vessel 112. The air supply valve 159 may be installed on the air supply channel 154. That is, the air supply valve 159 may be installed between the connection 154a to the first main channel 41 of the air supply channel 154 and the connection 157a to the air exhaust channel 157.

Figure 2:
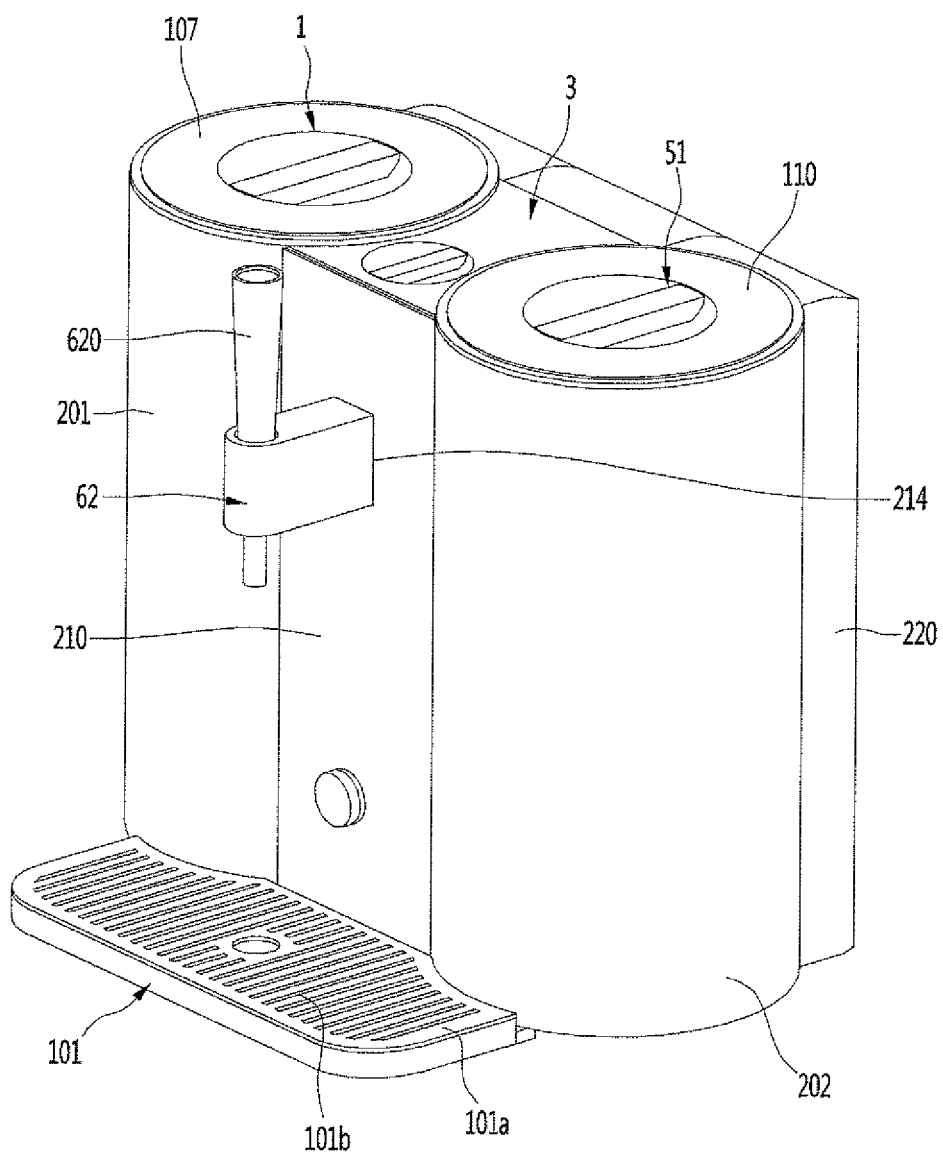
FIG. 2 is a perspective view of a beverage maker according to an embodiment.

FIG. 2 is a perspective view of a beverage maker according to an embodiment. The beverage maker may include a beverage container 101 that may receive beverage that falls from the dispenser 62 and store the beverage therein. Beverage that falls to around a beverage vessel (not shown) among the beverage that falls from the dispenser 62 may be dropped to a container top plate 101a and may be temporarily stored in the beverage container 101 through a hole 101b defined in the container top plate 101b. Thus, an area around the beverage maker may be kept clean.

Water tank 51 may be spaced horizontally from the fermenting module 1. That is, the water tank 51 and the fermenting module 1 may be spaced laterally.

The beverage maker may further include water tank lid 110 that covers an open top face of the water tank 51. The water tank lid 110 may open and close the open top face of the water tank 51.

The water tank lid 110 may be formed in a same or similar shape as fermentation lid 107. As a result, the beverage maker may have a sense of unity in design and the same components may be used for the water tank lid 110 and the fermentation lid 107.

The beverage maker may include covers 201, 202, 210, and 220 that form an appearance of the beverage maker. The covers 201, 202, 210, and 220 may be integrally formed; alternatively, a plurality of members may be combined with each other in terms of manufacturing and maintenance.

The covers 201, 202, 210, and 220 may include a fermentation module cover 201, a water tank cover 202, a front cover 210, and a rear cover 220. The fermentation module cover 201 and the water tank cover 202 may respectively surround at least a portion of outer circumferences of fermentation module 1 and water tank 51. The fermentation module cover 201 and the water tank cover 51 may respectively secure the fermentation module 1 and the water tank 51 and respectively protect the fermentation module 1 and the water tank 51 from external impact.

The fermentation module cover 201 and the water tank cover 202 may be arranged to be spaced apart from each other in the horizontal direction. A top face of the fermentation module cover 201 may be open and the fermentation lid 107 may be exposed upward. Further, a top face of the water tank cover 202 may be open and the water tank lid 110 may be exposed upward. This allows the user to easily open and close the fermentation lid 107 and the water tank lid 110.

The front cover 210 may form a front outer appearance of the beverage maker. The front cover 210 may be disposed between a front face of the fermentation module cover 201 and a front face of the water tank cover 202.

The front cover 210 may be disposed between the fermentation module cover 201 and the water tank cover 202. Side ends of the front cover 210 may be in contact with the fermentation module cover 201 and the water tank cover 202, respectively. The rear cover 220 may form a rear outer appearance of the beverage maker. The rear cover 220 may be disposed at a rear of a rear face of the fermentation module cover 201 and a rear face of the water tank cover 202.

The ingredient feeder 3 may be disposed between the fermenting module 1 and the water tank 51. Thus, the beverage maker may be more compact than when the ingredient feeder 3 is positioned other than between the fermenting module 1 and the water tank 51. Further, the ingredient feeder 3 may be protected by the fermenting module 1 and the water tank 51.

The ingredient feeder 3 may be positioned between the front cover 210 and the rear cover 220 in an anteroposterior direction. A front face of the ingredient feeder 3 may be covered by the front cover 210 and a rear face thereof may be covered by the rear cover 220.

The dispenser 62 may be mounted on the front cover 210, That is, the dispenser 62 may be provided on a front face of the front cover 210.

The dispenser 62 may be positioned at an upper side of the beverage container 101. The user may extract the beverage by manipulating lever 620 of the dispenser 62.

The front cover 210 may be provided with a dispenser mount 214 on which the dispenser 62 may be mounted. The dispenser mount 214 may be formed at a position closer to an upper end than a lower end of the front cover 210.

The decompression mechanism 90 (see FIG. 1) connected to the dispenser 62 by the second beverage discharge channel 61*b* may be positioned at a rear of the front cover 210. Further, the decompression mechanism 90 may be positioned between the fermenting module 1 and the water tank 51 in a lateral direction.

Figure 3:
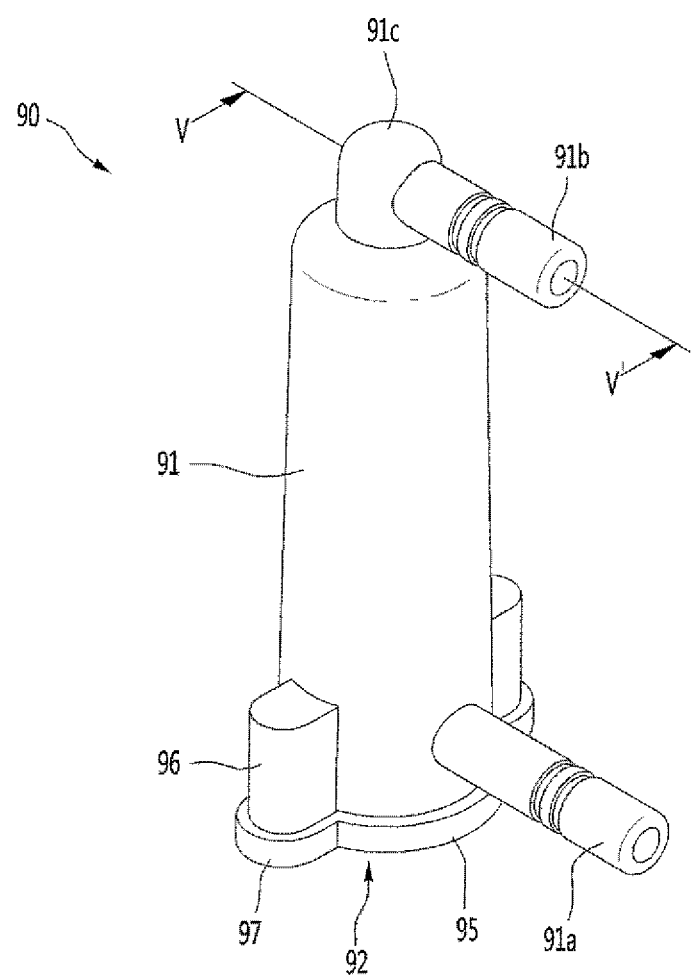
FIG. 3 is a perspective view of a decompression mechanism according to an embodiment.
Figure 4:
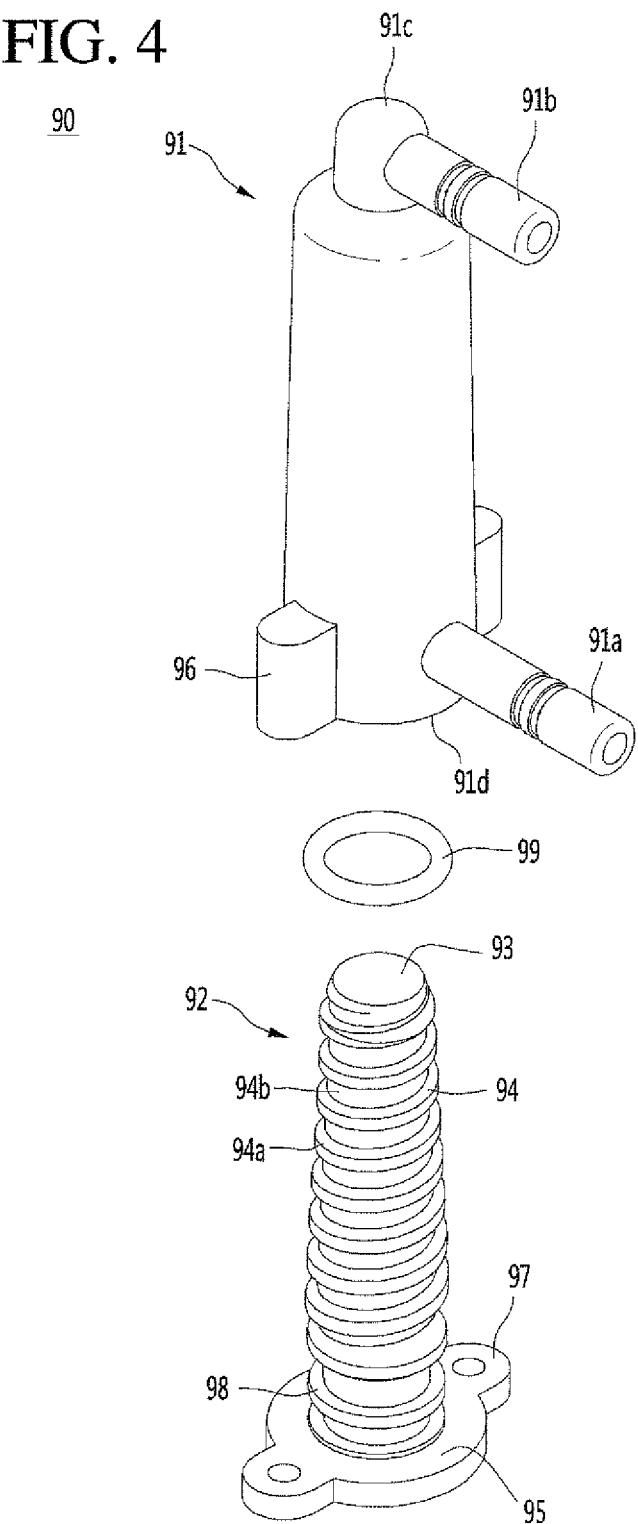
FIG. 4 is an exploded perspective view of a decompression mechanism according to an embodiment.
Figure 5:
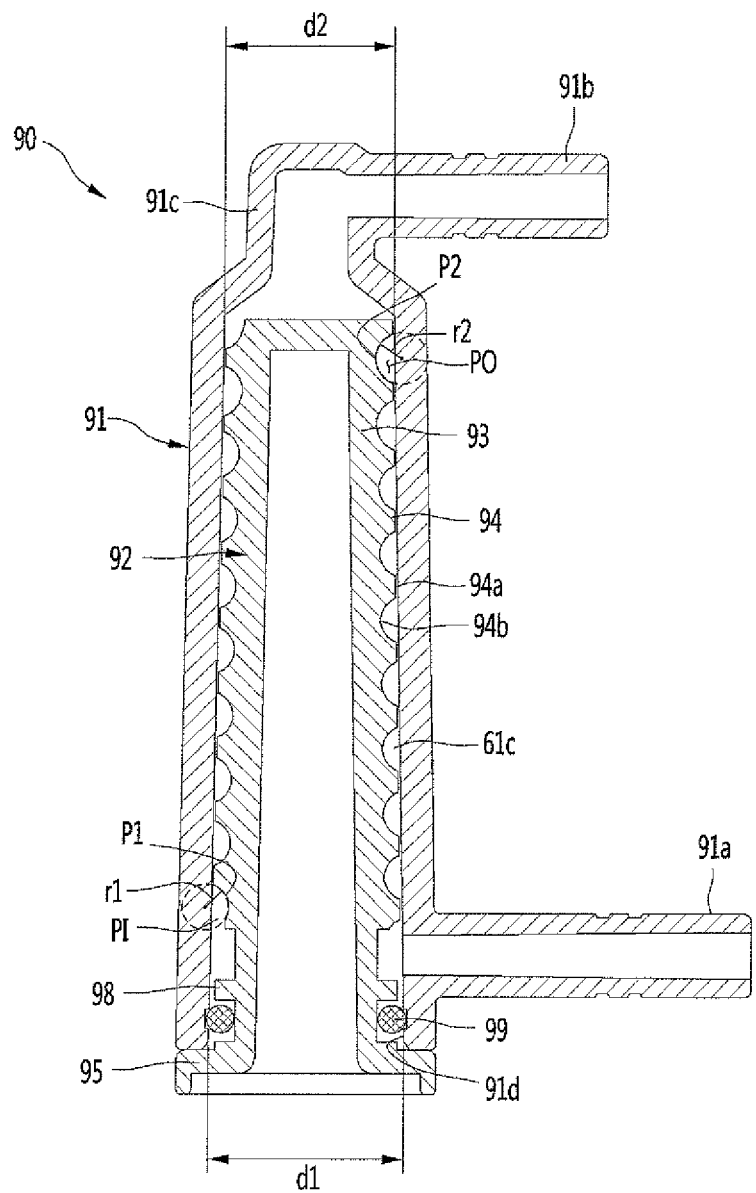
FIG. 5 is a cross-sectional view taken along line V-V' of FIG. 3.

FIG. 3 is a perspective view of a decompression mechanism according to an embodiment. FIG. 4 is an exploded perspective view of a decompression mechanism according to an embodiment. FIG. 5 is a cross-sectional view taken along line V-V' of FIG. 3.

Hereinafter, decompression mechanism 90 will be described.

The decompression mechanism 90 may include a decompression case 91, a decompression inner member 92 inserted into the decompression case 91, and a decompression channel 61*c* defined between the decompression case 91 and the decompression inner member 92. The decompression case 91 may be elongated in one direction. In one embodiment, the decompression case 91 may be elongated in the vertical direction; however, embodiments are not limited thereto.

The decompression case 91 may be formed in a cylindrical shape or a conical shape in which a hollow is defined therein. The decompression case 91 may be formed with an open portion 91*d* into which the decompression inner member 92 may be inserted and an interior of the decompression case 91 may define the hollow which communicates with the open portion 91*d*.

The open portion 91*d* of the decompression case 91 may be defined at a position closer to inlet 91*a* than outlet 91*b* described hereinafter. In one embodiment, a bottom face of the decompression case 91 may be open to define the open portion 91*d*.

The inlet 91*a* through which the beverage may flow into the decompression mechanism 90 and the outlet 91*b* through which the beverage may be discharged may be formed on the decompression case 91. The first beverage discharge channel 61*a* (see FIG. 1) may be connected to the inlet 91*a* and the second beverage discharge channel 61*b* (see FIG. 1) may be connected to the outlet 91*b*. The inlet 91*a* and the outlet 91*b* may communicate with the decompression channel 61*c*. The beverage flowing into the inlet 91*a* may pass through the decompression channel 61*c*, and then be discharged through the outlet 91*b*.

The inlet 91*a* and the outlet 91*b* may extend outwardly from the decompression case 91. Extending directions of the inlet 91*a* and the outlet 91*b* may be the same as each other. That is, the inlet 91*a* and the outlet 91*b* may be formed in parallel with each other.

In one embodiment, the inlet 91*a* may extend outwardly from a lower outer circumference of the decompression case 91. The outlet 91*b* may extend outwardly of a protrusion 91*c* that protrudes upwardly from a top end of the decompression case 91. However, without being limited thereto, in one embodiment, the outlet 91*b* may extend outwardly from an upper outer circumference of the decompression case 91.

An inner diameter of the decompression case 91 may decrease as the decompression case 91 extends in a direction from the inlet 91*a* to the outlet 91*b*. In one embodiment, the inner diameter of the decompression case 91 may decrease as the decompression case 91 extends upwardly. That is, an inner diameter d1 of a bottom end of the decompression case 91 may be larger than an inner diameter d2 of a top end of the decompression case 91. In this case, the top end of the decompression case 91 may mean a top end of a portion excluding the protruding portion 91*c*.

The decompression inner member 92 may be inserted into the decompression case 91 through the open portion 91*d* of the decompression case 91. That is, the decompression inner member 92 may include an inner body 93 positioned inside of the decompression case 91, and a guide 94 formed in a spiral shape on an outer circumference of the inner body 93.

The inner body 93 may have a substantially bar shape. In order to reduce a weight of the decompression mechanism 90, an empty space may be defined inside the inner body 93.

The inner body 93 may extend in a same direction as the inner case 91. In one embodiment, the inner body 93 may extend in the vertical direction.

The guide 94 may guide the beverage to flow along the decompression channel 61*c*. The guide 94 may be formed in the spiral shape along the outer circumference of the inner body 93. In one embodiment, the guide 94 may have a shape spiraled from a lower portion of the inner body 93 to an upper portion thereof. That is, the guide 94 may be configured similar to a thread.

The guide 94 may be in contact with an inner circumference of the inner case 91. That is, the guide 94 may include a crest 94*a* in contact with the inner circumference of the decompression case 91, and a valley 94*b* positioned between one crest 94*a* and another crest 94*a* and spaced apart from the inner circumference of the decompression case 91.

With the above configuration of the guide 94, the decompression channel 61*c* may be defined between the decompression inner member 92 and the decompression case 91. That is, the decompression channel 61*c* may be defined by the guide 94 and the inner circumference of the decompression case 91.

The decompression channel 61*c* may be formed in the shape spiraled along the outer circumference of the decompression inner member 92. A length of the decompression channel 61*c* may be increased by the spiral structure. In addition, the decompression mechanism 90 may be compact even though the length of the decompression channel 61*c* may be increased.

The decompression channel 61*c* may respectively communicate with the first beverage discharge channel 61*a* (see FIG. 1) and the second beverage discharge channel 62*b* (see FIG. 1), respectively, through the inlet 91*a* and the outlet 91*b*. In the first beverage discharge channel 61*a*, the decompression channel 61c may guide the beverage flowing in through the inlet 91a to the outlet 91b. The beverage may be discharged through the outlet 91b to the second beverage discharge channel 61b.

The decompression channel 61c may include an input opening PI in communication with the inlet 91a and an output opening PO in communication with the outlet 91b. An internal cross-sectional area of the decompression channel 61c may increase as the channel extends from the input opening PI to the output opening PO. A cross-sectional area of the input opening PI of the decompression channel 61c may be smaller than a cross-sectional area of the output opening PO.

The cross-sectional area of the output opening PO of the decompression channel 61c may be in a range of 1.2 times to 2.3 times the cross-sectional area of the input opening PI of the decompression channel 61c, and may be around 1.6 times the cross-sectional area of the inlet opening P1 of the decompression channel 61c. As a result, a pressure of the beverage flowing through the decompression channel 61c may not be abruptly reduced, but rather, moderately reduced to suppress generation of bubbles.

In one embodiment, the valley 94b of the guide 94 may be rounded to have a predetermined radius of curvature. A radius of curvature r1 of a first point P1 of the valley 94b of the guide 94 corresponding to the input opening PI of the decompression channel 61c may be smaller than a radius of curvature r2 of a second point P2 of the valley 94b of the guide 94 corresponding to the output opening PO of the decompression channel 61c. That is, the radius of curvature of the valley 94b of the guide 94 may gradually increase as the valley 94b of the guide 94 extends in a direction from the first point P1 to the second point P2.

The radius of curvature r2 of the second point P2 may be in a range of 1.1 times to 1.5 times of the radius of curvature r1 of the first point P1, and may be around 1.25 times the radius of curvature r1 of the first point P1. In one embodiment, the radius of curvature r1 of the first point P1 may be approximately 3.5 mm and the radius of curvature r2 of the second point P2 may be approximately 4.5 mm.

In addition, a length of the decompression channel 61c may be much larger than the radius of curvature of the valley 94b of the guide 94. This is to sufficiently and slowly decompress the beverage flowing through decompression channel 61c.

For example, the length of the decompression channel 61c may be as large as 100 times or greater the radius of curvature r1 of the first point P1, and may be 120 times or greater the radius of curvature r1 of the first point P1. For example, the radius of curvature r1 of the first point P1 may be approximately 3.5 mm and the length of the decompression channel 61c may be approximately 432 mm.

The decompression inner member 92 may further include a cover 95 that blocks the open portion 91d of the decompression case 91. The cover 95 may be formed at an end of the inner body 93. The cover 95 may be spaced apart from the guide 94. A size of the cover 95 may be larger than a size of the open portion 91d of the decompression case 91.

A first fastener 96 may be formed on the decompression case 91, and a second fastener 97 to be fastened to the first fastener 96 may be formed on the cover 95.

The first fastener 96 may be formed adjacent to the open portion 91d. In one embodiment, the first fastener 96 may be formed at a lower portion of the decompression case 91. The first fastener 96 may protrude outwardly of a lower outer circumference of the decompression case 91 in a radial direction of the decompression case 91.

The first fastener 96 may include a fastening boss, and the fastening boss may include a plurality of fastening bosses spaced apart from each other. The second fastener 97 may be formed at a position corresponding to the first fastener 96. In one embodiment, the second fastener 97 may protrude outwardly of the outer circumference of the cover 95 in a radial direction of the cover 95.

The second fastener 97 may include a fastening hole through which a fastening member, such as a screw, for example, may pass, and a number of the fastening holes may be the same as a number of the fastening bosses. The fastening member, such as the screw, may pass through the fastening hole and be fastened to the fastening boss. Whereby the first fastener 96 and the second fastener 97 may be fastened together and the decompression case 91 and the decompression inner member 92 may be fastened together.

The decompression mechanism 90 may further include a seal 99 that blocks a gap between the open portion 91d of the decompression case 91 and the decompression inner member 92. The seal 99 may include an o-ring. Further, the decompression inner member 92 may be formed with a fixing portion 98 to which the seal 99 may be fixed. The fixing portion 98 may be spaced apart from the guide 94.

The inlet 91a of the decompression case 91 may be directed toward a portion of the outer circumference of the inner body 93 between the guide 94 and the fixing portion 98. In one embodiment, the fixing portion 98 may protrude outwardly from the outer circumference of the inner body 93 in a radial direction of the inner body 93. In this case, the seal 99 may be inserted and fixed between the fixing portion 98 and the cover 95. However, without being limited thereto, in one embodiment, the fixing portion 98 may include a pair of protrusions that protrudes from the inner body 93 and being spaced apart from each other. Further, the seal 99 may be inserted and fixed between the pair of protrusions. Because of the seal 99, the beverage flowing to the inlet 91a may be prevented from flowing into the decompression channel 61c and from leaking between the open portion 91d and the cover 95.

Figure 6:
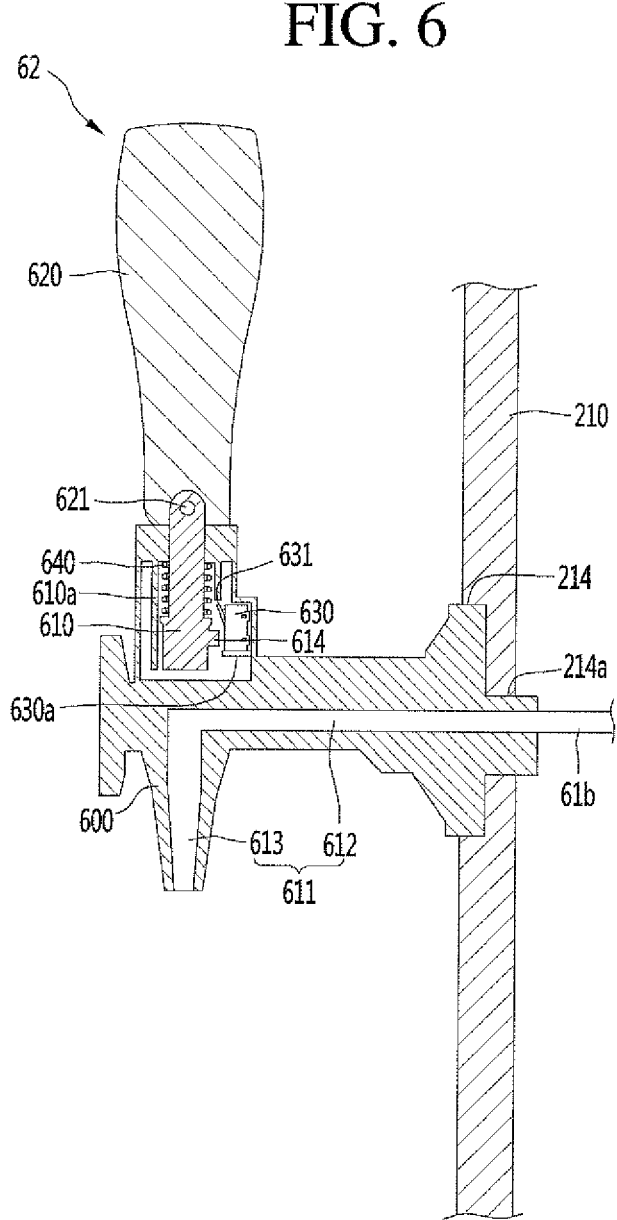
FIG. 6 is a cross-sectional view illustrating an internal structure of a dispenser according to an embodiment.
Figure 7:
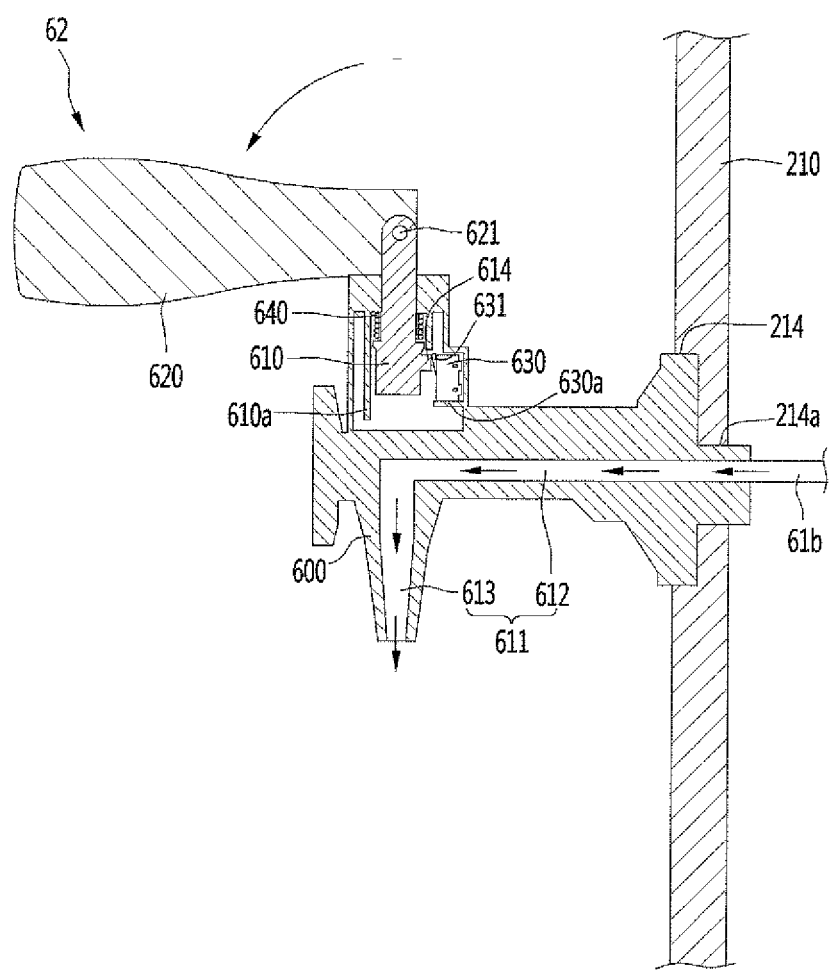
FIG. 7 is diagram illustrating a flow direction of beverage discharged from a dispenser when a beverage discharge valve is opened.

FIG. 6 is a cross-sectional view illustrating an internal structure of a dispenser according to an embodiment. FIG. 7 is a diagram illustrating a flow direction of beverage discharged from a dispenser when a beverage discharge valve is opened.

The dispenser 62 may include dispenser body 600, ascending and descending body 610, lever 620, and limit switch 630. A dispenser channel 611 connected to the beverage discharge channel 61 may be defined in the dispenser body 600.

The dispenser channel 611 may include a first dispenser channel 612 defined horizontally or obliquely along the dispenser body 600, and a second dispenser channel 613 defined to bend in a downward direction from a tip of the first dispenser channel 612. The beverage which has passed through the decompression mechanism 90 and been guided to the second beverage discharge channel 61b may be dropped to a lower side of the second dispenser channel 613 after sequentially passing through the first dispenser channel 612 and the second dispenser channel 613 when the ascending and descending body 610 is opened.

The ascending and descending body 610 may be disposed to ascend and descend inside the dispenser body 600. The dispenser body 600 may have guide 610a that guides the ascending and descending body 610 up and down.

The dispenser 62 may further include a valve spring 640 disposed in the dispenser body 600 that elastically presses the ascending and descending body 610 downward. The valve spring 640 may be disposed at an inner side of the guide 610*a* of the dispenser body 600 and may elastically press the ascending and descending body 610 in the downward direction.

The lever 620 may be rotatably connected to an upper portion of the ascending and descending body 610 to ascend and descend the ascending and descending body 610 during a rotating operation of the lever 620. The lever 620 may be connected to a hinge 621 at the upper portion of the ascending and descending body 610 and may be vertically erected or horizontally laid out while connected to the ascending and descending body 610.

Limit switch 630 may be switched by the ascending and descending body 610. The dispenser body 600 may be provided with a switch mount 630*a* on which the limit switch 630 may be mounted.

A manipulation protrusion 614 engaged with a terminal 631 of the limit switch 630 when the ascending and descending body 610 ascends may protrude from the ascending and descending body 610. When the ascending and descending body 610 ascends, the manipulation protrusion 614 may be engaged with the terminal 631 of the limit switch 630 and when the ascending and descending body 610 descends, the manipulation protrusion 614 may be disengaged from the terminal 631 of the limit switch 630.

When the lever 620 is laid out horizontally, the ascending and descending body 610 may ascend to turn the limit switch 630 on and when the lever 620 is erected vertically, the ascending and descending body 610 may descend to turn the limit switch 630 off. The limit switch 630 may be electrically connected to a controller of the beverage maker. The controller may control the beverage maker based on an on/off state of the limit switch 630.

When the user manipulates the lever 620 in a direction of opening the dispenser 62, the ascending and descending body 610 ascends and is engaged with the limit switch 630. Then, the controller may sense opening of the dispenser 62. In this case, the controller may open the beverage discharge valve 64. Then, the beverage of the first beverage discharge channel 61*a* may sequentially pass through the beverage discharge valve 64, the decompression mechanism 90, and the second beverage discharge channel 61*b* to flow to the dispenser channel 611 and may be discharged from the dispenser 62.

Conversely, when the user manipulates the lever 620 in a direction of closing the dispenser 62, the ascending and descending body 610 descends and is disengaged from the limit switch 630. Further, the controller may sense closure of the dispenser 62. In this case, the controller may close the beverage discharge valve 64 and the beverage of the first beverage discharge channel 61*a* may not pass through the beverage discharge valve 64.

The dispenser body 600 may be mounted in dispenser mount 214 formed on the front cover 213. The dispenser mount 214 may be formed on the front face of the front cover 210, so that the dispenser 62 may be mounted on the front face of the front cover 210. The dispenser mount 214 may include a through-hole, and the dispenser body 600 or the second beverage discharge channel 61*b* may be positioned in the through-hole.

Figure 8:
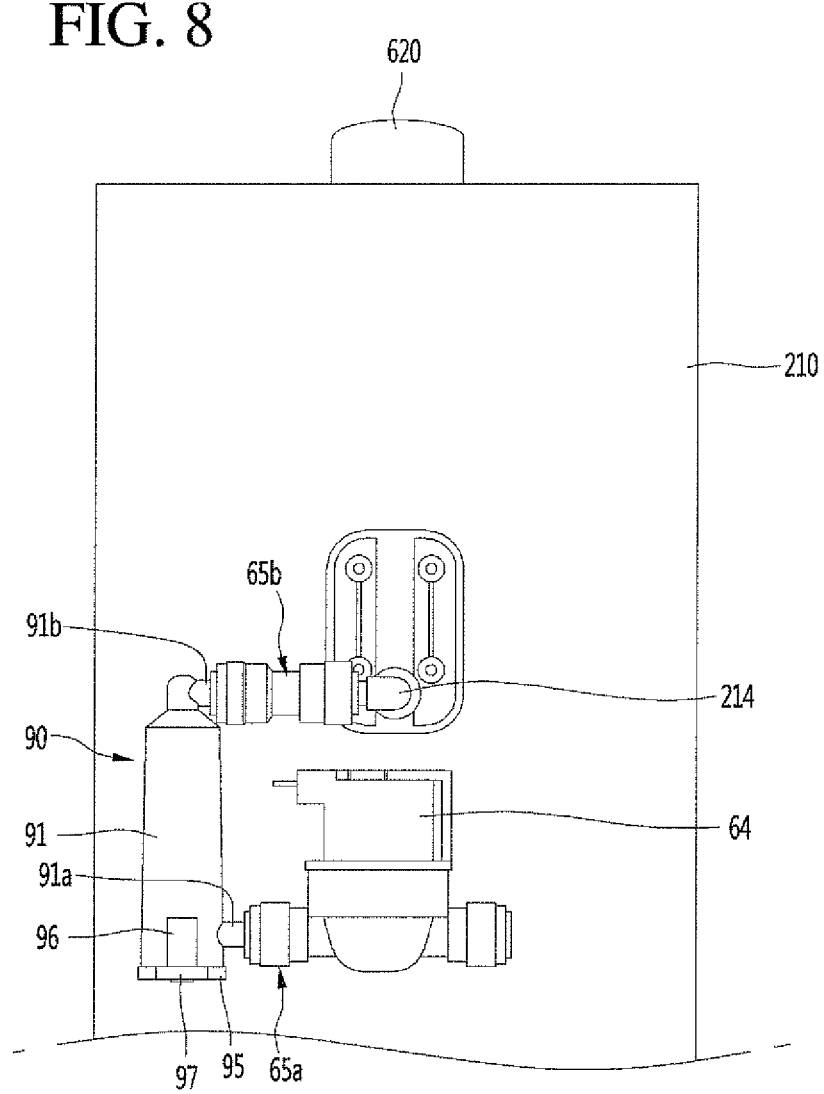
FIG. 8 is a rear view of a front cover illustrating a beverage discharge valve and a decompression mechanism according to an embodiment in a rear view of a front cover.

FIG. 8 is a rear view of a front cover illustrating a beverage discharge valve and a decompression mechanism according to an embodiment in a rear view of a front cover.

The beverage discharge valve 64 and the decompression mechanism 90 may be positioned at a rear of the front cover 210. Further, the beverage discharge valve 64 and the decompression mechanism 90 may be positioned between the fermenting module 1 and the water tank 51 (see FIG. 2) in the lateral direction. The beverage discharge valve 64 may be mounted on a rear face of the front cover 210.

The decompression mechanism 90 may be positioned on a side of the front cover 210. In one embodiment, the decompression mechanism 90 may be located at a left or first side of the beverage discharge valve 64 in a rear view. In this case, the inlet and outlet of the decompression mechanism 90 may extend in a rightward or first direction from the decompression case. With this arrangement, the beverage discharge valve 64 and the decompression mechanism 90 may be disposed adjacent to or in contact with the front cover 210 and the internal space of the beverage maker may be used efficiently.

The beverage maker may further include a first fitting 65*a* forming at least a portion of the first beverage discharge channel 61*a* and a second fitting 65*b* forming at least a portion of the second beverage discharge channel 61*b*, In one embodiment, an internal channel of the first fitting 65*a* may define a portion of the first beverage discharge channel 61*a* and an inner channel of the second fitting 65*b* may define a second beverage discharge channel 62*a*. The first fitting 65*a* may connect the beverage discharge valve 64 with the inlet 91*a* of the decompression mechanism 90 and the second fitting 65*b* may connect the dispenser 62 with the outlet 91*b* of the decompression mechanism 90.

The first fitting 65*a* and the second fitting 65*b* may support the decompression mechanism 90. Thus, the decompression mechanism 90 may be supported by the first fitting 65*a* and the second fitting 65*b* and suspended in the air. A position of the decompression mechanism 90 may be fixed without a separate support structure that supports the decompression mechanism 90.

Hereinafter, a discharging process of the beverage will be described with reference to FIG. 1, FIG. 7, and FIG. 8.

When the user manipulates the lever 620 in a direction of opening the dispenser 62, the limit switch 630 may be engaged with the manipulation protrusion 614 and the controller of the beverage maker may open the main valve 40 and the beverage discharge valve 64. Further, the controller may turn on the air injection pump 82 and open air supply opening and closing valve 159. At this time, the exhaust valve 156 may be kept closed.

When the air injection pump 82 is turned on, the air may be passed through the air injection channel 81 and the air supply channel 154 sequentially and supplied between the outer face of the fermentation container 12 and the inner wall of the fermentation vessel 112. The air between the fermentation container 12 and the fermentation vessel 112 may pressurize the fermentation container 12 such that the beverage in the fermentation container 12 may ascend to the main channel connection 115 through the tube 115*a*.

The beverage in the fermentation container 12 may flow from the fermentation container 12 through the main channel connection 115 to the second main channel 42 or may flow to the first beverage discharge channel 61*a* through the main valve 40 by the air pressure between the fermentation container 12 and the fermentation vessel 112.

The beverage flowing into the first beverage discharge channel 61*a* may be received into the inlet 91*a* of the decompression mechanism 90 through the beverage discharge valve 64. The beverage received into the inlet 91*a* may flow along the spiral decompression channel Sic formed between the decompression case 91 and the decompression inner member 92 and the internal pressure may gradually decrease. The beverage passed through the decompression channel 61*c* may be discharged to the outlet 91*b* and may be guided to the dispenser channel 611 of the dispenser 62 by the second beverage discharge channel 61*b*. The beverage received into the dispenser channel 611 may sequentially pass through the first and second dispenser channels 612 and 613 and be discharged from the dispenser 62.

On the other hand, when the user manipulates the lever 620 in a direction of closing the dispenser 62 after partially discharging the beverage through the dispenser 62, the limit switch 630 may be disengaged from the manipulation protrusion 614 and the controller may close the main valve 40 and the beverage discharge valve 64.

Embodiments disclosed herein provide a decompression mechanism that prevents occurrence of excessive bubbles during discharging of fermented beverage and a beverage maker including the decompression mechanism. The decompression mechanism according to embodiments may include a decompression channel whose internal cross-sectional area gradually increases along a flow direction of a beverage to gradually decompress a pressure of the beverage.

Embodiments disclosed herein provide a decompression mechanism that may include a decompression case having an inlet that receives a beverage and an outlet that discharges the beverage; a decompression inner member including an inner body positioned inside of the decompression case and a guide formed in a spiral shape on an outer circumference of the inner body and in contact with an inner face of the decompression case; and a decompression channel defined between the decompression case and the decompression inner member. The decompression channel may have an input opening in communication with the inlet and an output opening in communication with the outlet, and a cross-sectional area of the decompression channel may increase as the decompression channel extends from the input opening to the output opening.

An inner diameter of the decompression case may decrease as the decompression case extends in a direction from the inlet toward the outlet. The decompression case may have an open portion defined therein into which the decompression inner member may be inserted. The open portion may be closer to the inlet than to the outlet.

The decompression inner member may further include a cover that blocks the open portion. A first fastener may be formed on the decompression case, and a second fastener to be fastened to the first fastener may be formed on the cover.

The decompression mechanism may further include a seal that blocks a gap between the open portion and the decompression inner member. The decompression inner member may have a fixing portion to which the seal may be fixed. The fixing portion may protrude outwardly of the outer circumference of the inner body.

The fixing portion may be spaced apart from the guide. The inlet may be directed toward a portion of the outer circumference of the inner body between the guide and the fixing portion. The inlet and the outlet may extend in a same direction.

A valley of the guide may be rounded to have a predetermined radius of curvature. A radius of curvature of a first point of the valley of the guide corresponding to the input opening of the decompression channel may be smaller than a radius of curvature of a second point of the valley of the guide corresponding to the output opening of the decompression channel. The curvature radius of the second point may be in a range of 1.1 times to 1.5 times of the radius of curvature of the first point. A length of the decompression channel may be as large as 100 times or greater the radius of curvature of the first point.

Embodiments disclosed herein provide a beverage maker that may include a fermenting module; a beverage discharge channel in communication with the fermenting module; a beverage discharge valve installed on the beverage discharge channel; a decompression mechanism that receives a beverage from the beverage discharge valve; and a dispenser that receives the beverage from the decompression mechanism and discharges the beverage. The decompression mechanism may include a decompression case having an inlet in communication with the beverage discharge valve and an outlet in communication with the dispenser; a decompression inner member including an inner body positioned inside of the decompression case and a guide formed in a spiral shape on an outer circumference of the inner body in a lengthwise direction of the inner body and in contact with an inner face of the decompression case; and a decompression channel defined between the decompression case and the decompression inner member. The decompression channel may be in communication with the inlet and an outlet, and a cross-sectional area of the decompression channel may decrease as the decompression channel extends in a direction from the inlet to the outlet.

The decompression mechanism may be closer to the beverage discharge valve than to the dispenser in a flow direction of the beverage. The beverage maker may further include a front cover having the dispenser disposed on a front face thereof.

The beverage discharge valve and the decompression mechanism may be disposed at a rear of the front cover. The beverage discharge valve may be mounted on a rear face of the front cover.

The beverage maker may further include a first fitting that connects the beverage discharge valve with the inlet, and a second fitting that connects the dispenser with the outlet. The first fitting and the second fitting may support the decompression mechanism.

According to embodiments disclosed herein, as the cross-sectional area of the decompression channel gradually increases, a pressure of the beverage passing through the decompression channel may not be changed suddenly, which may reduce the occurrence of bubbles in the beverage. Further, the guide defining the decompression channel may be formed in a spiral shape on the outer circumference of the inner body, so that the decompression mechanism may be compact in size while a length of the decompression channel is increased.

Furthermore, the seal may prevent the beverage received into the decompression mechanism from leaking between the open portion of the decompression case and the cover portion of the decompression inner member. Also, the decompression mechanism may be supported by the first fitting and the second fitting, so that a separate decompression mechanism supporting structure is unnecessary.

The foregoing description is merely illustrative of the technical idea. Embodiments may be variously modified and altered by those skilled in the art to which the embodiments pertain without departing from the spirit and scope. Therefore, embodiments are provided to explain the spirit and scope, but not to limit thereto, so that the spirit and scope is not limited by the embodiments. The scope should be construed on the basis of the accompanying claims, and all the technical ideas within the scope equivalent to the claims should be included in the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beverage maker, comprising:
   a fermenting module;
   a beverage discharge channel in communication with the fermenting module;
   a beverage discharge valve installed on the beverage discharge channel;
   a decompression mechanism that receives a beverage from the beverage discharge valve;
   a dispenser that receives the beverage from the decompression mechanism and discharges the beverage; and
   a front cover having the dispenser disposed on a front face thereof, wherein the decompression mechanism includes:
      a decompression case having an inlet in communication with the beverage discharge valve and an outlet in communication with the dispenser;
      a decompression inner member including an inner body positioned inside of the decompression case and a guide formed in a spiral shape on an outer circumference of the inner body in a lengthwise direction of the inner body and in contact with an inner face of the decompression case; and
      a decompression channel defined between the decompression case and the decompression inner member, wherein the decompression channel is in communication with the inlet and the outlet, and wherein a cross-sectional area of the decompression channel increases as the decompression channel extends in a direction from the inlet to the outlet, wherein the beverage discharge valve is mounted on a rear face of the front cover, and wherein the beverage maker further comprising:
      a first fitting that connects the beverage discharge valve with the inlet; and
      a second fitting that connects the dispenser with the outlet, wherein the first fitting and the second fitting support the decompression mechanism.

2. The beverage maker of claim 1, wherein the decompression mechanism is closer to the beverage discharge valve than to the dispenser in a flow direction of the beverage.

3. The beverage maker of claim 1, wherein the beverage discharge valve and the decompression mechanism are disposed at a rear of the front cover.

4. The beverage maker of claim 1, wherein an inner diameter of the decompression case decreases as the decompression case extends in a direction from the inlet toward the outlet.

5. The beverage maker of claim 1, wherein the decompression case has an open portion defined therein into which the decompression inner member is inserted, and wherein the open portion is closer to the inlet than to the outlet.

6. The beverage maker of claim 5, wherein the decompression inner member further includes a cover that blocks the open portion.

* * * * *